US006571168B1

(12) United States Patent
Murphy et al.

(10) Patent No.: US 6,571,168 B1
(45) Date of Patent: May 27, 2003

(54) SYSTEM FOR DETERMINING FUEL USAGE WITHIN A JURISDICTION

(75) Inventors: Gregory P. Murphy, Columbus, IN (US); Allen F Muellenbach, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 187 days.

(21) Appl. No.: 09/274,617

(22) Filed: Mar. 23, 1999

(51) Int. Cl.[7] .......................... G06F 19/00; G06G 7/70

(52) U.S. Cl. ......................... 701/123; 701/30; 701/213; 340/438; 340/450.2; 340/457

(58) Field of Search .......................... 701/123, 29, 30, 701/35, 200, 201, 207, 213, 1; 73/114, 113; 340/436, 438, 439, 441, 450, 450.2, 457; 360/5, 6; 123/487, 376, 379; 342/357.06, 357.07, 357.13, 357.17

(56) References Cited

U.S. PATENT DOCUMENTS 4,067,061 A * 1/1978 Juhasz .......................... 360/5
4,212,195 A * 7/1980 Young .......................... 73/114
4,307,452 A * 12/1981 Mizote .......................... 701/123
5,303,163 A * 4/1994 Ebaugh et al. .............. 700/274
5,359,528 A 10/1994 Haendel et al. .............. 701/35
5,365,451 A 11/1994 Wang et al. ............... 701/213
5,365,516 A 11/1994 Jandrell ....................... 370/335
5,396,254 A 3/1995 Toshiyuki ............. 342/357.13
5,428,546 A 6/1995 Shah et al. ................ 701/207
5,436,840 A 7/1995 Lam et al. .................. 701/208
5,452,211 A 9/1995 Kyrtsos et al. ............. 701/215
5,488,559 A 1/1996 Seymour .................... 701/208
5,490,073 A 2/1996 Kyrtsos ....................... 701/207
5,523,765 A 6/1996 Ichikawa .................... 342/451
5,532,690 A 7/1996 Hertel ......................... 340/989
5,550,743 A 8/1996 Kyrtsos ....................... 701/213
5,552,794 A 9/1996 Colley et al. .......... 342/357.05
5,557,524 A 9/1996 Maki ........................... 701/35
5,563,786 A 10/1996 Torii ........................... 701/23
5,581,259 A 12/1996 Schipper ..................... 342/451
5,594,650 A 1/1997 Shah et al. ................. 701/207
5,596,500 A 1/1997 Sprague et al. ............. 701/213
5,600,558 A * 2/1997 Mearek et al. ................ 701/35
5,612,703 A 3/1997 Mallinckrodt ............... 342/457
5,618,232 A 4/1997 Martin ......................... 463/25
5,638,077 A 6/1997 Martin .................. 342/357.03
5,642,284 A * 6/1997 Parupalli et al. .............. 701/30
5,642,711 A * 7/1997 Boner et al. ................ 123/379
5,646,630 A 7/1997 Sheynblat et al. ..... 342/357.14
5,913,917 A * 6/1999 Murphy ...................... 701/123
5,928,291 A * 7/1999 Jenkins et al. ................. 701/1
5,954,773 A * 9/1999 Luper .......................... 701/35
5,995,886 A * 11/1999 Tanaka et al. ................ 701/30
6,016,795 A * 1/2000 Ohki .......................... 132/681

* cited by examiner

*Primary Examiner*—Jacques H Louis Jacques
(74) *Attorney, Agent, or Firm*—Barnes & Thornburg

(57) ABSTRACT

A system for determining fuel usage within a jurisdiction includes a control computer operable to control fueling of an internal combustion engine and an auxiliary computer coupled thereto, wherein the auxiliary computer forms part of an operator interface unit. The control computer is operable to broadcast current fuel usage information in a number of fuel usage categories, and the auxiliary computer is operable to accumulate such fuel usage information within each jurisdiction traveled by the vehicle. In one embodiment, a GPS receiver provides the auxiliary computer with information relating to a current vehicle jurisdiction, and in an alternate embodiment, an auxiliary switch is provided wherein manual actuation of the auxiliary switch indicates entrance into a new jurisdiction. In either case, the auxiliary computer is operable to accumulate information relating to the total fuel used in a number of fuel usage categories, for each jurisdiction traveled by the vehicle, whereby this information is particularly useful in subsequently computing state fuel tax data.

27 Claims, 5 Drawing Sheets

SYSTEM FOR DETERMINING FUEL USAGE WITHIN A JURISDICTION

FIELD OF THE INVENTION

The present invention relates generally to systems for determining fuel usage for fuel tax computation purposes, and more specifically to such systems operable to automatically track fuel usage within a definable jurisdiction.

BACKGROUND OF THE INVENTION

In the commercial trucking industry, it is desirable to track data associated with vehicle travel within a definable jurisdiction. Such data may include distance traveled, time of travel, fuel used, etc. Not only is such data valuable to commercial fleet owners/operators in tracking vehicle performance, at least some of this data is necessary for properly allocating vehicle operating information among the various jurisdictions (i.e., states, regions, counties, etc.) traveled. Properly allocated vehicle operating information may then be used for determining state fuel tax, DOT location for status changes, route recording, and the like.

Heretofore, it has been known to automatically track mileage traveled within a state for fuel tax computation purposes. U.S. Pat. No. 5,359,528 to Haendel et al. discloses one such system including a global positioning system (GPS) receiver, a truck odometer, a memory containing state boundaries, a processor and a recording device. The Haendel et al. system is operable to determine the state in which the vehicle is traveling by comparing current GPS coordinates with stored coordinates of state boundaries. When the vehicle enters a new state, the processor is operable to automatically record a state identifier along with the odometer mileage. Upon trip completion, the recorded information may be downloaded and processed to determine the mileage traveled within each state. Fuel tax may then be allocated among the various states in accordance with the mileage data.

While the Haendel et al. system provides a useful system for accurately determining mileage traveled within each state, it has certain drawbacks associated therewith, particularly when used for computing fuel tax information. For example, while the distance traveled within any state may accurately reflect road use, it is not a reliable predictor of fuel usage. Fuel usage is actually a function of many factors including, but not limited to, vehicle size/engine rating, vehicle/engine operating characteristics, vehicle operator tendencies, distance traveled, road conditions, weather conditions, traffic conditions, and the like. A system operable to determine only distance traveled within a jurisdiction therefore cannot accurately and reliably estimate fuel usage during travel. Moreover, emissions regulations within some jurisdictions may require an accurate determination of fuel used during idling conditions, and the Haendel et al. system includes no provisions for making such a determination.

What is therefore needed is a system for accurately determining fuel usage within a definable jurisdiction. Ideally, such a system should be operable to differentiate at least between fuel used during driving and fuel used during idling conditions.

SUMMARY OF THE INVENTION

The foregoing shortcomings of the prior art are addressed by the present invention. In accordance with one aspect of the present invention, a system for determining fuel usage within a jurisdiction comprises means for determining a jurisdiction of a vehicle carrying an internal combustion engine, means responsive to fueling signals for supplying fuel to the engine, means for producing the fueling signals and for producing fueling values corresponding to fuel quantities associated with the fueling signals, and means for continually accumulating the fueling values while the vehicle is within the jurisdiction to thereby determine a total fuel quantity used by the engine within the jurisdiction.

In accordance with another aspect of the present invention, a system for determining fuel usage within a jurisdiction comprises a fuel system responsive to fueling signals to supply fuel to an internal combustion engine, a control computer producing the fueling signals and broadcasting fueling values corresponding to fuel quantities associated with the fueling signals, and a driver interface module including means for determining a jurisdiction of a vehicle carrying the internal combustion engine and an auxiliary computer receiving the fueling values broadcast by the control computer, the auxiliary computer continually accumulating the fueling values as long as the vehicle is within the jurisdiction to thereby determine a total fuel quantity used by the engine within the jurisdiction.

In accordance with yet another aspect of the present invention, a method of determining fuel usage within a jurisdiction comprising the steps of determining a jurisdiction of a vehicle carrying an internal combustion engine, recording a fueling value corresponding to a current quantity of fuel used by the engine, and monitoring vehicle location and continually accumulating the fueling value as long as the vehicle is located within the jurisdiction to thereby determine a total amount of fuel used by the engine within the jurisdiction.

One object of the present invention is to provide an improved system for determining fuel usage within any jurisdiction.

Another object of the present invention is to provide such a system operable to distinguish fuel used within any jurisdiction according to vehicle/engine operational mode.

Yet another object of the present invention is to provide a system for determining fuel usage within any jurisdiction via, in part, fueling messages broadcast by a vehicle/engine control computer onto a J1587 or J1939 datalink.

These and other objects of the present invention will become more apparent from the following description of the preferred embodiment.

DESCRIPTION OF THE PREFERRED EMBODIMENTS

Figure 1:
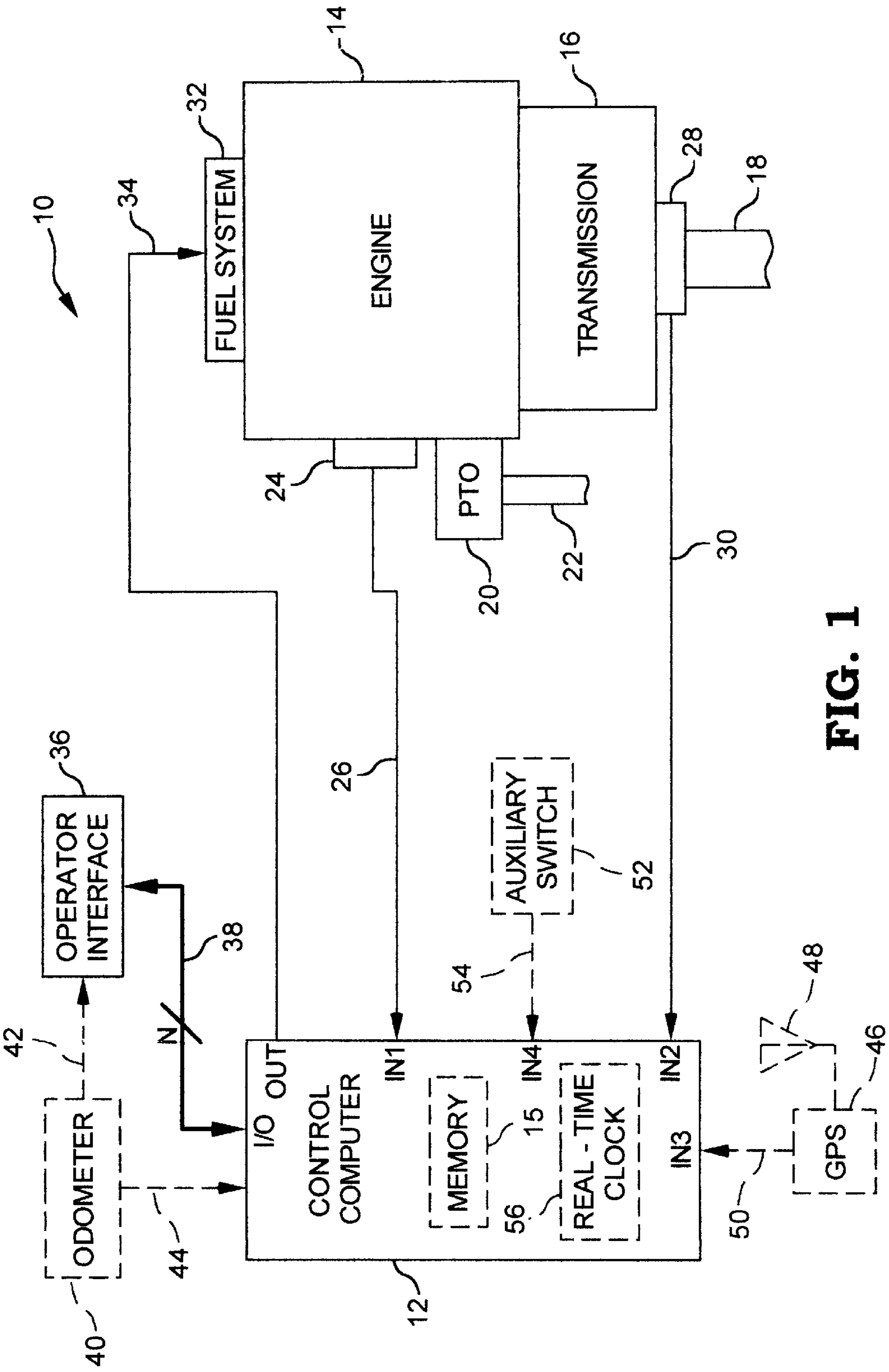
FIG. 1 is a diagrammatic illustration of one preferred embodiment of a system for determining fuel usage within a jurisdiction, in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, one preferred embodiment of a system 10 for determining fuel usage within a jurisdiction, in accordance with the present invention, is shown. System 10 includes a control computer 12 operable to control and manage the overall operation of an internal combustion engine 14. Control computer 12 is preferably microprocessor-based and includes a memory 15. In one embodiment, control computer 12 may by an engine control unit (ECU), electronic control module (ECM), powertrain control module (PCM) and/or the like, although the present invention contemplates that control computer 12 may alternatively be any computer operable to control at least some of the functions associated with engine 14 and/or the vehicle carrying engine 14.

Engine 14 is coupled to a transmission 16 of known construction, and transmission 16 is coupled to a propeller shaft or tailshaft 18. In operation, engine 14 is operable to transfer torque to tailshaft 18 via transmission 16, wherein tailshaft 18 is operable to drive a number of vehicle wheels as is known in the art. Engine 14 may further have a power-take-off (PTO) unit 20 coupled thereto and having another propeller shaft 22 extending therefrom. In a PTO operational mode, engine 14 is operable to drive propeller shaft 22 via PTO unit 20 to thereby provide torque to an auxiliary device connected to shaft 22 as is known in the art.

System 10 includes a number of sensors and/or sensing systems operable to provide control computer 12 with information relating to engine and/or vehicle operation. For example, an engine speed sensor 24 is operatively connected to engine 14 and electrically connected to an input IN1 of control computer 12 via signal path 26. In one embodiment, engine speed sensor 24 is a Hall effect sensor operable to detect passage thereby of a number of teeth of a tone wheel or other toothed wheel or gear rotating synchronously with the engine crankshaft, and provide an analog engine speed signal to control computer 12 indicative of engine rotational speed and/or engine position. However, the present invention contemplates other embodiments of sensor 24, such as a variable reluctance sensor for example, wherein sensor 24 is, in any case, operable to provide control computer 12 with a signal indicative of engine speed and/or position.

System 10 further includes a vehicle speed sensor 28 preferably disposed about tailshaft 18 adjacent to the transmission 16 and electrically connected to an input IN2 of control computer 12 via signal path 30. Vehicle speed sensor 28 is preferably a variable reluctance sensor, although the present invention contemplates that sensor 28 may be any known sensor suitably positioned to detect vehicle speed and provide a vehicle speed signal to control computer 12 indicative thereof.

System 10 further includes a fuel system 32 of known construction and operatively coupled to engine 14 as is known in the art. Fuel system 32 is electrically connected to an output OUT of control computer 12 via at least one signal path 34. Control computer 12 is operable, as is known in the art, to compute and provide fueling signals on signal path 34, wherein fuel system 32 is responsive to the fueling signals to supply fuel to engine 14.

System 10 further includes an operator interface 36 of known construction electrically connected to an input/output port I/O of control computer 12 via number, N, of signal paths 38, wherein N may be any integer. In one embodiment, signal paths 38 comprise a serial data link configured in accordance with SAE J1587 specifications. Alternatively, signal paths 38 may comprise a serial data link configured in accordance with SAE J1939 specifications. Alternatively still, signal paths 38 may be any known communications link configured for transferring data between control computer 12 and operator interface 36.

System 10 may optionally include an odometer 40 of known construction and electrically connected to operator interface 36 via signal path 42 and electrically connected to control computer 12 via signal path 44, as shown in phantom in FIG. 1. Odometer 40, if included in system 10, is operable to provide a signal on signal path 42 and/or 44 indicative of distance traveled by the vehicle, as is known in the art.

System 10 may also optionally include a global positioning system (GPS) receiver 46 of known construction and having a GPS antenna 48 connected thereto, as shown in phantom in FIG. 1. GPS receiver 46, if included in system 10, is electrically connected to an input IN3 of control computer 12 via signal path 50. In operation, GPS receiver 46 periodically receives radio frequency signals broadcast by a number of earth orbiting satellites (not shown), wherein the received radio frequency signals include information relating to a position of the receiver 46, typically in terms of latitudinal, longitudinal and altitudinal coordinates, as well date and time of day information. Computer 12 is operable to decode the received radio frequency signals into positional and date/time information.

System 10 may further optionally include an auxiliary switch 52 of known construction and electrically connected to an input IN4 of control computer 12 via signal path 54 as shown in phantom in FIG. 1. If included in system 10, auxiliary switch 52 may be an existing switch or a newly provided switch, and in either case is preferably located in the cab area of the vehicle and easily accessible by the vehicle operator. Switch 52 is responsive to manual actuation thereof to provide an active switch signal to control computer 52 via signal path 54.

Control computer 12 may optionally include a real-time clock portion 56 as shown in phantom in FIG. 1. Real-time clock 56 is operable to provide date and time of day information, as is known in the art, for use by control computer 12. Alternatively, real-time clock 56 may be provided external to control computer 12 via a real-time clock module of known construction.

Figure 2:
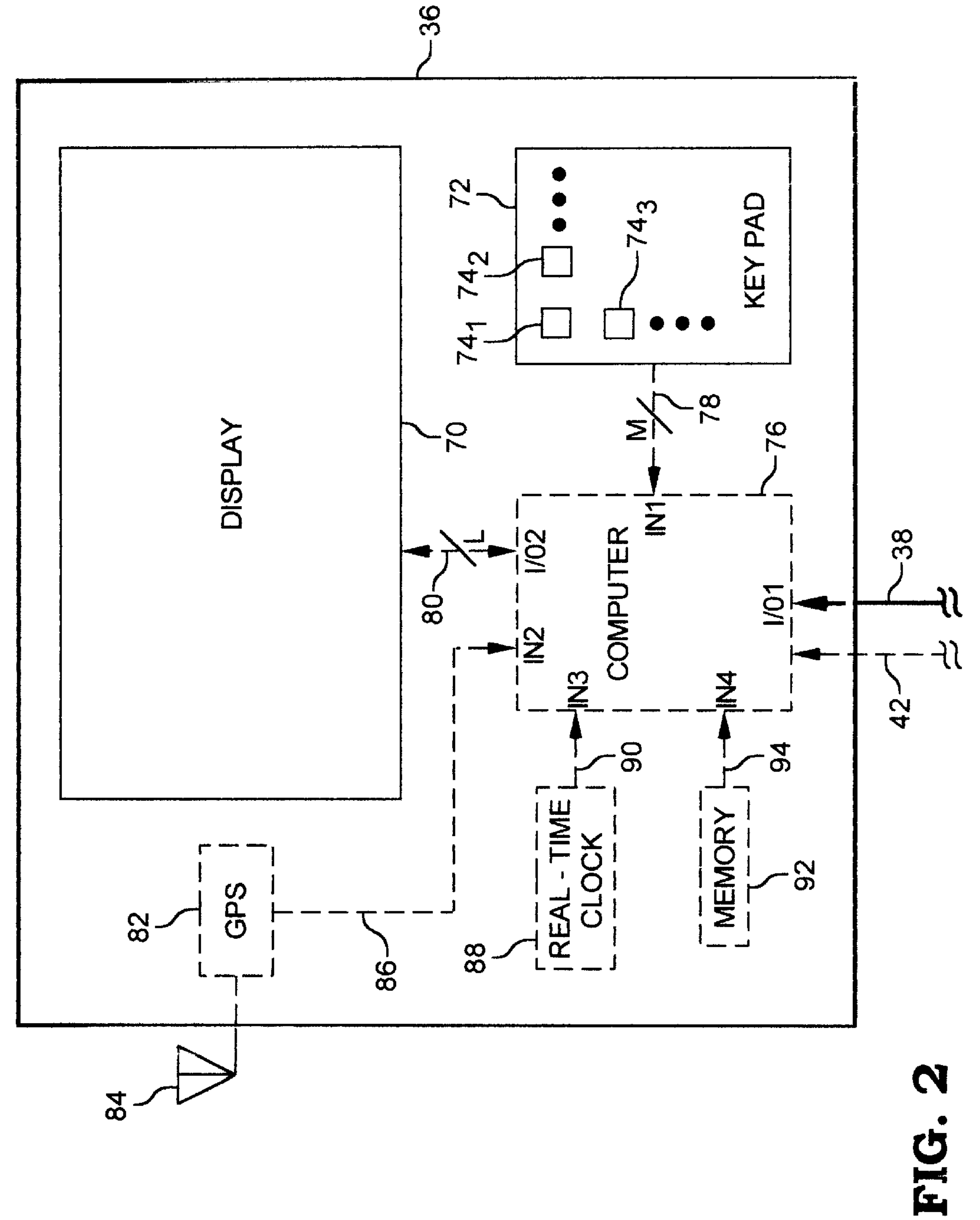
FIG. 2 is a diagrammatic illustration of one preferred embodiment of the driver interface of FIG. 1.

Referring now to FIG. 2, one preferred embodiment of the operator interface 36 of system 10, in accordance with the present invention, is shown. Interface 36 includes a display 70 electrically connected to an input/output port I/O2 of auxiliary computer 76 via a number, L, of signal paths, wherein L may be any integer. Display 70 is preferably a screen-type display operable to display at least alphanumeric characters and graphical information, and may further include at least one touch-screen switch (not shown) for manually entering instructions and/or information into computer 76 as is known in the art. Interface 36 further includes a keypad 72 or similar control panel having a number of key switches $74_1$, $74_2$, $74_3$ . . . electrically connected to an input port IN1 of auxiliary computer 76 via a number, M, of signal paths 78, wherein M may be any integer. Alternatively or additionally, keypad or control panel 72 may include any number of switches, rotary knobs, and/or the like, whereby instructions may be entered into computer 76 via any of such switches or control knobs.

Auxiliary computer 76 is preferably microprocessor-based and includes an input/output port I/O1 electrically connected to signal paths 38. In one embodiment, control computer 12 and auxiliary computer 76 are both configured for conducting communications therebetween on signal paths 38 in accordance with known J1587 or J1939 communications protocol. In this embodiment, as is known in the art, control computer 12 is operable to continuously broadcast certain engine/vehicle operating information onto signal paths 38, whereby auxiliary computer 76 is operable to receive and use any such information as desired.

Operator interface 36 preferably includes a GPS receiver 82, as described hereinabove, having a GPS antenna 84 operatively connected thereto, wherein receiver 82 is electrically connected to auxiliary computer 76 via signal path 86. Interface 36 also preferably includes a memory unit 92 electrically connected to an input/output port I/O3 of computer 76 via signal paths 94. Alternatively, memory unit 92 may be included onboard auxiliary computer 76 as is known in the art. Interface 36 may also optionally include a real-time clock 88 electrically connected to an input IN3 of auxiliary computer 76 via signal path 90.

In one embodiment, operator interface 36 is a known interface unit available through the assignee of the present invention under the name "RoadRelay". An example of such an operator interface 36 is described in U.S. Pat. No. 5,303,163 to Ebaugh et al., which is assigned to the assignee of the present invention, and the details of which are incorporated herein by reference.

Figure 3:
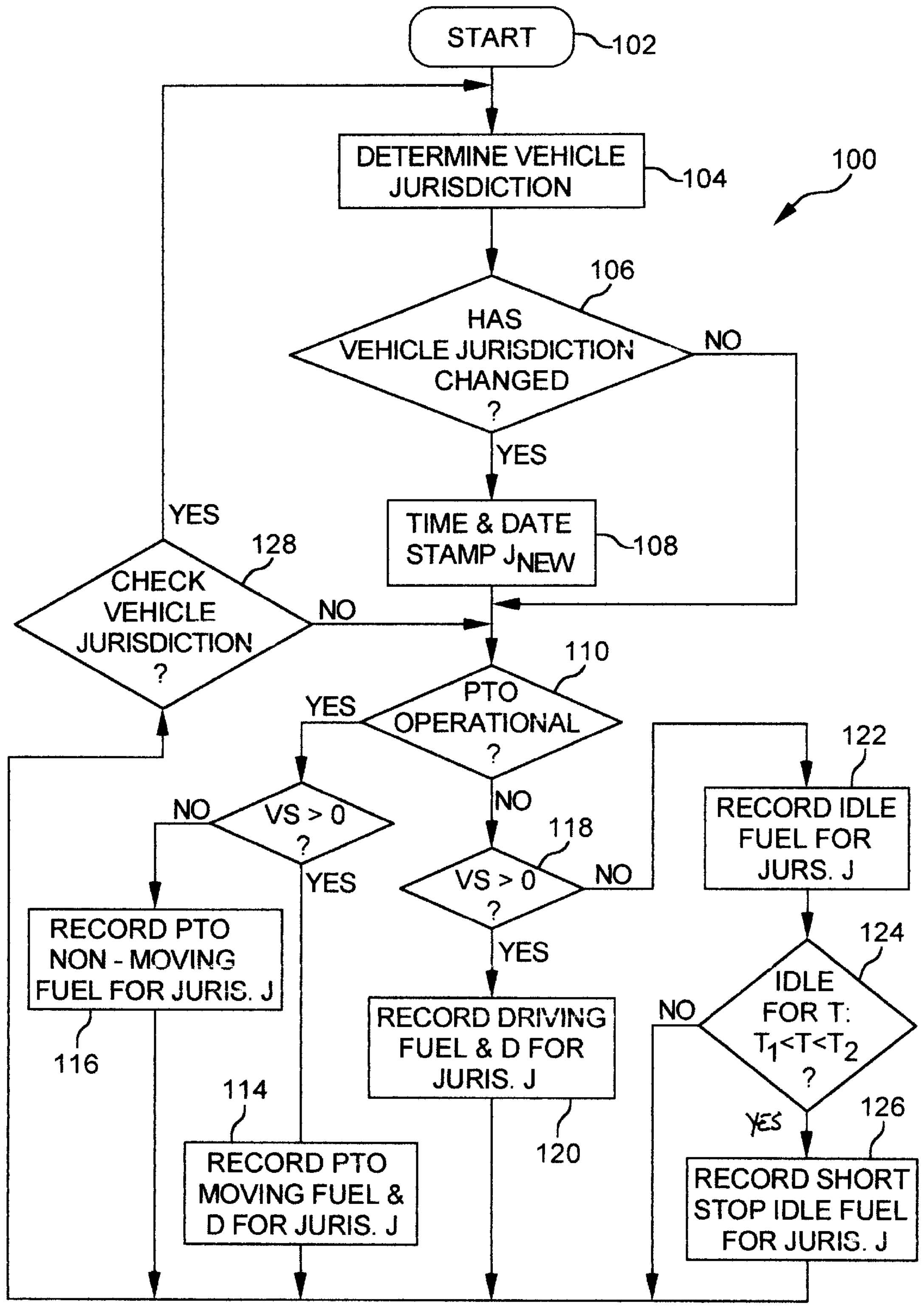
FIG. 3 is a flowchart illustrating one preferred embodiment of a software algorithm, executable by the system of FIG. 1, for determining fuel usage within a jurisdiction according to the present invention.

In accordance with the present invention, system 10 is operable to determine a total amount of fuel used by engine 14 in any of a number of jurisdictions in which the vehicle carrying engine 14 travels, wherein the term "jurisdiction" may be any definable land mass or drive path that is traversible by the vehicle carrying engine 14. Referring now to FIG. 3, a flowchart illustrating one preferred embodiment of a software algorithm 100 for determining fuel usage within a jurisdiction, in accordance with the present invention, is shown. Algorithm 100 is preferably executed by the auxiliary computer 76 included within the driver interface module 36, although the present invention contemplates that algorithm 100 may alternatively be executed by control computer 12 illustrated in FIG. 1. Algorithm 100 will accordingly be described with reference to FIGS. 1–4(*a*) and 4(*b*) as being executed by auxiliary computer 76, except certain steps that are to be executed by control computer 12 as described below, although references will be made throughout this description to suitable modifications of algorithm 100 to be alternatively executed completely by control computer 12.

Algorithm 100 begins at step 102 and at step 104, auxiliary computer 76 is operable to determine a current jurisdiction of the vehicle carrying engine 14. In one preferred embodiment of the present invention, system 10 includes a global positioning system (GPS) receiver operable to receive radio frequency signals (hereinafter GPS signals) transmitted by a number of earth orbiting satellites (not shown), wherein such received signals include information relating to latitudinal, longitudinal and altitudinal coordinates of the GPS receiver as well as date and time of day information, as is known in the art. In an embodiment wherein auxiliary computer 76 is operable to execute algorithm 100 as described hereinabove, GPS receiver 82 is preferably operable to receive GPS signals and provide such signals to auxiliary computer 76 via signal path 86. Alternatively, control computer 12 may include a GPS receiver 46 connected thereto as described hereinabove, wherein GPS receiver 46 is operable to receive GPS signals and provide such signals to control computer 12 via signal path 50, and wherein control computer 12 is operable to transmit such signals to auxiliary computer 76 via signal paths 38. On the other hand, in an embodiment wherein control computer 12 is operable to execute algorithm 100 as described hereinabove, GPS receiver 46 is preferably operable to receive GPS signals and provide such signals to control computer 12 via signal path 48. In any case, GPS signals are, in accordance with one preferred embodiment of step 104 of algorithm 100, processed to determine a current jurisdiction of the vehicle carrying engine 14.

Figure 4A:
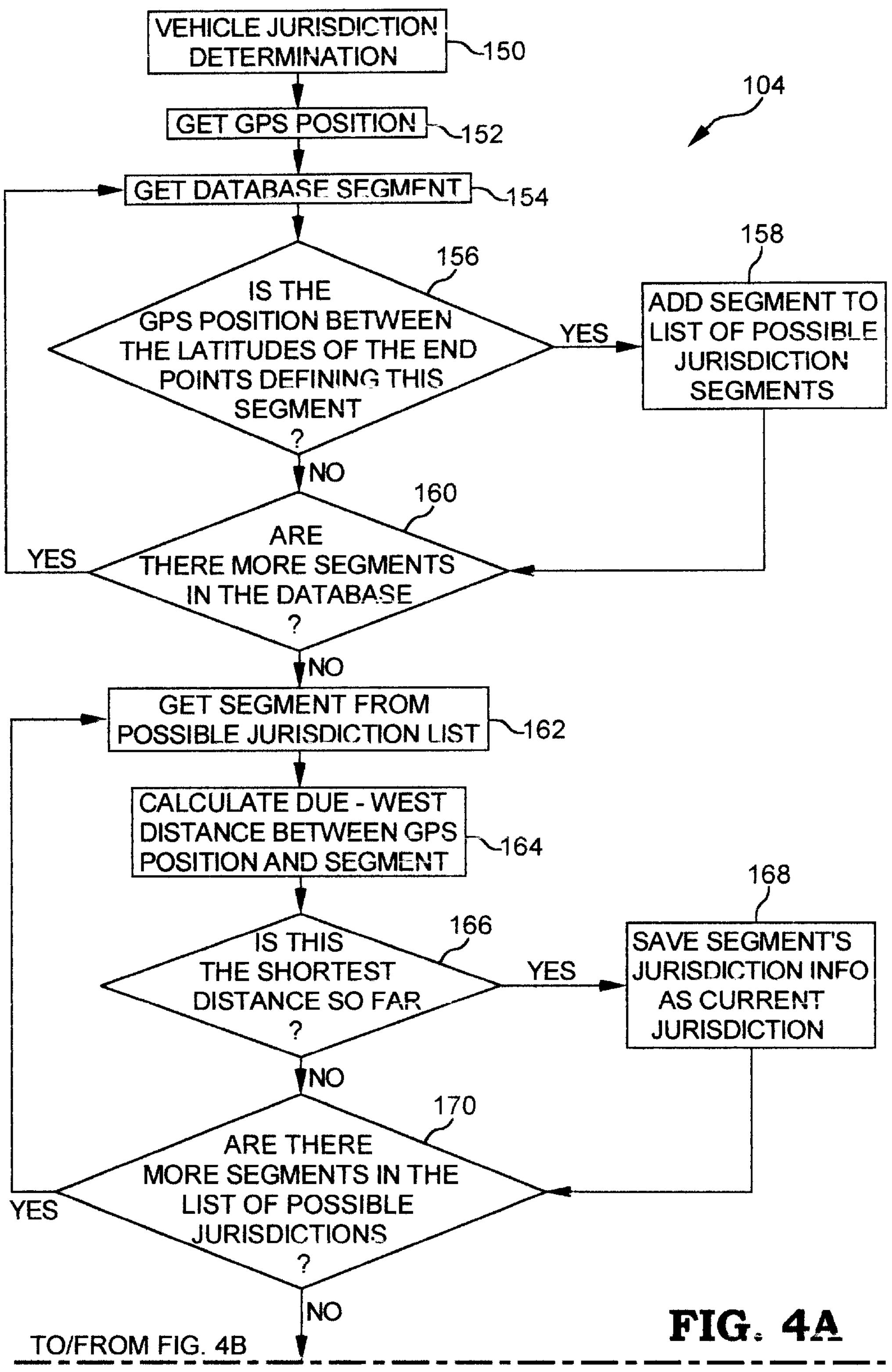
FIGS. 4(*a*) and 4(*b*) are a flowchart illustrating one preferred embodiment of a software algorithm, executable by the system of FIG. 1, for determining a current jurisdiction of the vehicle according to the present invention.
Figure 4B:
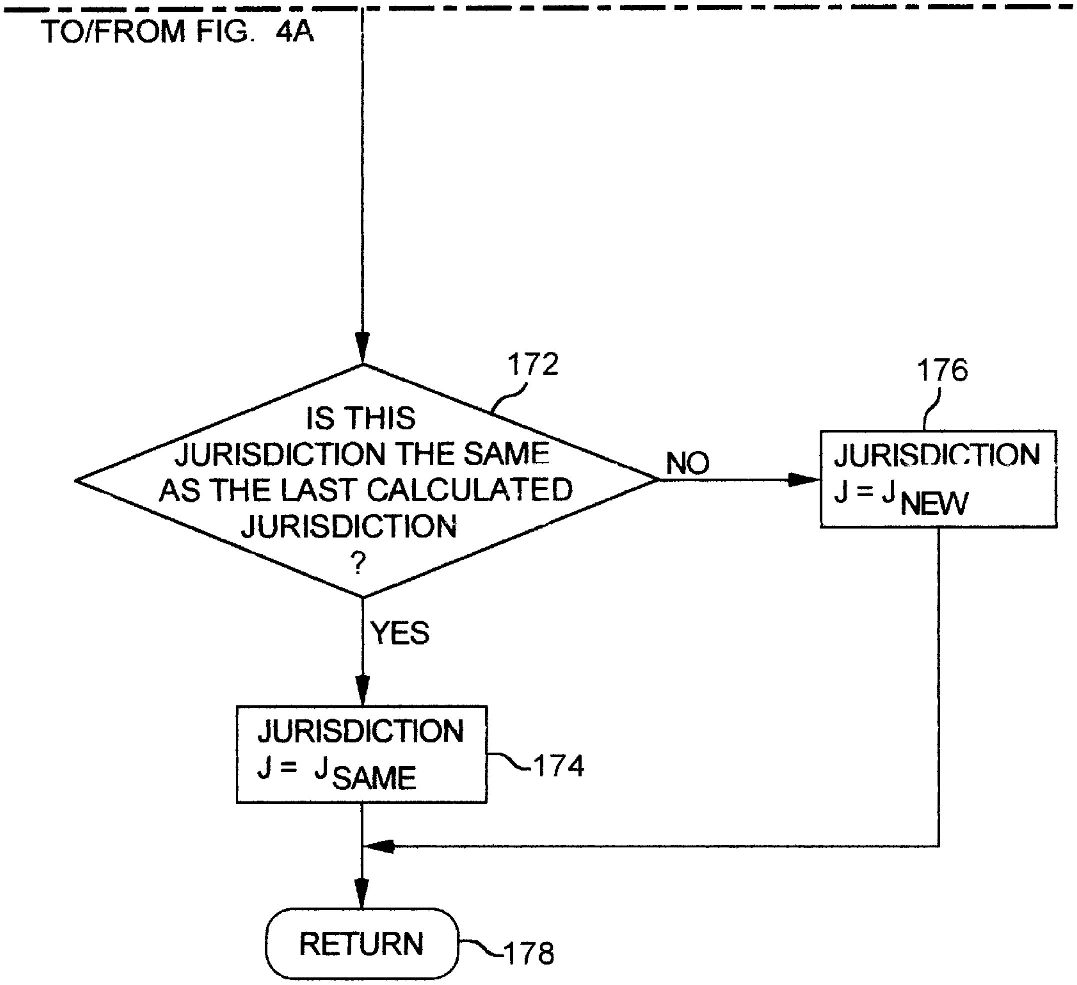

Referring now to FIGS. 4A and 4B, one preferred embodiment of step 104 for determining a current jurisdiction of the vehicle carrying engine 14 via processing of GPS coordinates is shown. Step 104 illustrated in FIG. 4 is embodied as an algorithm 150 for comparing GPS signals with jurisdiction boundary information preferably stored in memory 92, and determining therefrom a current vehicle jurisdiction. As with algorithm 100, algorithm 150 will be described as being executed by auxiliary computer 76, although it is to be understood that the present invention contemplates that algorithm 150 may alternatively be executed by control computer 12, wherein jurisdiction boundary information is preferably stored within memory 15.

Algorithm 150 begins at step 152 where auxiliary computer 76 is operable to receive GPS signals from GPS receiver 82 and process such signals to determine therefrom latitudinal, longitudinal and altitudinal coordinates indicative of a current location of receiver 82 as well as date and time of day information. It is to be understood that auxiliary computer 76 may use any one or combination of the latitudinal, longitudinal and altitudinal coordinates in determining the current location, or GPS position, of the vehicle carrying engine 14, as is known in the art. In any case, algorithm 150 advances from step 152 to step 154 where auxiliary computer 76 is operable to retrieve a database segment from memory 92, wherein the database segment is defined by at least a pair of GPS positions (i.e., at least two GPS location points). In one embodiment, the database segment retrieved at step 154 is one nearest in proximity to the current GPS position, although the present invention contemplates choosing the database segment to be retrieved at step 154 according to other desired strategies. From step 154, algorithm 150 advances to step 156 where auxiliary computer 76 is operable to determine whether the current GPS position determined at step 152 is between the latitudes of the endpoints defining the segment retrieved at step 154. If so, algorithm execution advances to step 158 where auxiliary computer 76 is operable to add the database segment retrieved at step 154 to a list of possible jurisdiction segments. Algorithm execution continues from step 158, and also from step 156 if auxiliary computer 76 determines at step 156 that the GPS position determined at step 152 is not between the latitudes of the endpoints defining the database segment retrieved at step 154, at step 160 where auxiliary computer 76 is operable to determine whether any more database segments exist in the database. If so, algorithm execution loops back to step 154 to retrieve another database segment. If not, algorithm execution continues at step 162.

At step 162, auxiliary computer 76 is operable to retrieve a database segment from the list of possible jurisdiction segments compiled via step 158. Thereafter at step 164, auxiliary computer 76 is operable to calculate a due-west distance between the GPS position determined at step 152 and the database segment retrieved from the list of possible jurisdiction segments. Those skilled in the art will recognize that auxiliary computer 76 may alternatively be operable at step 164 to calculate a due east, north or south distance between the current GPS position and the database segment retrieved from the list of possible jurisdiction segments. Thereafter at step 166, auxiliary computer 76 is operable to determine whether the distance calculated at step 164 is the shortest distance calculated at that step thus far. If so, algorithm execution continues at step 168 where auxiliary computer 76 saves the segment's jurisdiction information as the current jurisdiction of the vehicle carrying engine 14. In one embodiment, the jurisdiction information associated with the various database segments is a state identification, although the present invention contemplates that the jurisdiction information may alternatively be, or additionally include, country identification, county identification, municipality identification, city vs. rural distinction, and the like. In any case, algorithm execution continues from step 168, or from step 166 if the distance calculated at step 166 is not the shortest distance thus far, at step 170 where auxiliary computer 76 determines whether any more segments exist in the list of possible jurisdiction segments. If any more such segment exist, algorithm execution loops back to step 162. If not, algorithm execution advances to step 172.

At step 172, auxiliary computer 76 is operable to compare the jurisdiction information saved at step 168 to the previous jurisdiction information (i.e., the jurisdiction information determined in the previous execution of algorithm 150). If the auxiliary computer 76 determines at step.172 that the jurisdiction has not changed, algorithm execution continues at step 174 where auxiliary computer 76 identifies the current jurisdiction (J) as the previously determined jurisdiction having a jurisdiction identity $J_{SAME}$. If, on the other hand, auxiliary computer 76 determines at step 172 that the jurisdiction has changed, algorithm execution continues at step 176 where auxiliary computer 76 identifies the current jurisdiction (j) as a new jurisdiction having a jurisdiction identity $J_{NEW}$. From either steps 174 or 176, algorithm execution advances at step 178 where algorithm 150 is returned to step 104 of algorithm 100 (FIG. 3).

In one preferred embodiment of algorithm 150, memory unit 92 contains a jurisdiction database that includes several thousand data points, wherein each data point includes a latitude, a longitude and a jurisdiction identifier. Two points define a database segment and any jurisdiction is defined a one or more GPS positions that is/are bounded by a number of database segments. Algorithm 150 is operable to search the database to determine all segments that lie east or west of the current GPS position, and the closest due-west segment determined from this list is the current jurisdiction. It is to be understood that algorithm 150 represents only one preferred embodiment of an algorithm for determining a current jurisdiction based on GPS coordinates, and that the present invention contemplates using any other known techniques, the importance of any such algorithm being that it has the capability to determine when the vehicle carrying engine 14 crosses jurisdictional boundaries.

Referring again to FIG. 3, auxiliary computer 76 may alternatively be operable at step 104 to determine a current vehicle jurisdiction by monitoring the status of an auxiliary switch, wherein manual activation of the auxiliary switch identifies a jurisdictional boundary crossing. This alternative embodiment recognizes that operator interface 36 and system 10 may not include a GPS receiver (82 or 46 respectively), in which case the vehicle operator has the responsibility to manually activate the auxiliary switch upon crossing a jurisdictional boundary. In one preferred embodiment, the auxiliary switch is one of the keys $\mathbf{74}_1$, $\mathbf{74}_2$, $\mathbf{74}_3$, . . . of keypad 72. Alternatively, the auxiliary switch signal monitored by auxiliary computer 76 may be a predefined sequence of one or more of the keys $\mathbf{74}_1$, $\mathbf{74}_2$, $\mathbf{74}_3$, . . . . In another alternative embodiment, the auxiliary switch may be a touch-screen switch forming part of display 70 as described hereinabove. Alternatively still, the auxiliary switch may be auxiliary switch 52 (FIG. 1), wherein control computer 12 is operable to monitor the status of auxiliary switch 52 and provide a signal to auxiliary computer 76 via signal paths 38 when activation of switch 52 is detected. In an embodiment of the present invention wherein control computer 12 is operable to execute algorithm 100, control computer 12 is preferably operable to execute this alternative technique for step 104 by monitoring auxiliary switch 52 and determining that a jurisdictional boundary has been crossed upon detection thereof.

Regardless of the strategy used for step 104, algorithm 100 advances therefrom to step 106 where auxiliary computer 76 is operable to determine whether the jurisdiction has changed; i.e. whether a jurisdictional boundary has been crossed. In embodiments including a GPS receiver, auxiliary computer 76 is operable to execute step 106 by comparing the jurisdiction identifier J from algorithm 150 with its previous value. In embodiments not including a GPS receiver, auxiliary computer 76 is operable to execute step 106 by determining whether the auxiliary switch was activated at step 104. In either case, if auxiliary computer 76 determines at step 106 that the vehicle jurisdiction has not changed, algorithm execution continues at step 110. If, on the other hand, auxiliary computer 76 determines at step 106 that the vehicle jurisdiction has changes, algorithm 100 advances to step 108 where auxiliary computer 76 is operable to time and date stamp the new jurisdiction identifier ($J=J_{NEW}$). In embodiments of the present invention including a GPS receiver, auxiliary computer 76 is preferably operable at step 108 to determine date and time of day information from the most recently received GPS signals (step 152 of algorithm 150), and date and time stamp the new jurisdiction identifier in accordance with known techniques. Alternatively, the operator interface 36 may include a real-time clock 88, as described hereinabove, wherein the auxiliary computer 76 is operable to date and time stamp the new jurisdiction identifier ($J=J_{NEW}$) with date and time of day information provided by clock 88. In embodiments of the present invention not including a GPS receiver, auxiliary computer 76 preferably includes real-time clock 88, and auxiliary computer 76 is operable at step 108 to enter a date and time of day at which the auxiliary switch was depressed. In embodiments of the present invention wherein control computer 12 is operable to execute algorithm 100, control computer 12 is operable at step 108 to date and time stamp jurisdictional identifier information in accordance with either date and time of day information provided by GPS receiver 46 or via information provided by a real-time clock unit 56 as just described with respect to auxiliary computer 76. Those skilled in the art will recognize that in embodiments of the present invention not including a GPS receiver, the various dates and times of day pairs may be downloaded after trip completion and compared with a trip log to thereby map the date and time of day pairs to appropriate jurisdictions. In any case, algorithm execution advances from step 108 to step 110.

At step 110, auxiliary computer 76 is operable to determine whether PTO mode is operational. In some vehicles, a PTO unit or assembly 20 may be coupled to engine 14 or transmission 16, wherein the engine 14 is operable to drive propeller shaft 22 in a PTO operational mode, as is known in the art. In such systems, a PTO switch is typically included (not shown in FIG. 1), wherein control computer 12 is responsive to the activation of such a PTO switch to actuate PTO unit 20 as is known in the art. Under such conditions, the vehicle may not be moving, such as when driving some types of agricultural machinery, or may be moving such as when driving a mixing drum of a cement mixer while traveling to a construction site. In other vehicles, such as medium and heavy duty trucks, the cruise control system may have a so-called PTO operational mode associated therewith. In such vehicles, cruise control may be activated via known cruise control switches at vehicle speeds above a threshold vehicle speed (e.g. 20 mph), and a PTO operational mode may be controlled via the cruise control switches at vehicle speeds below the threshold vehicle speed. In such a PTO operational mode, one or more engine speed values may be selected via appropriate control of the cruise control switches, and control computer 12 is operable to control engine speed to the desired engine speed value. Thus, control computer 12 may be operable at step 110 to determine that PTO is operational by monitoring a PTO switch (not shown) or by monitoring the status of one or more conventional cruise control switches along with vehicle speed. In either case, if control computer 12 determines that PTO is operational at step 110, algorithm execution continues at step 112 where control computer 12 is operable to determine whether vehicle speed is greater than a threshold vehicle speed (e.g. 0 mph). If control computer 12 determines that vehicle speed is not greater than the vehicle speed threshold at step 112, control computer 12 is operable to continually broadcast a PTO non-moving fuel value onto signal paths 38 as is known in the art, wherein the PTO non-moving fuel value corresponds to a fueling command issued by control computer 12 to fuel system 32 indicative of a current fueling rate under a non-moving vehicle PTO operational mode. In this case, auxiliary computer 76 is operable at step 116 to receive the PTO non-moving fuel value broadcast by control computer 12 and record this fueling value for the present jurisdiction within memory 92. If, on the other hand, control computer 12 determines at step 112 that vehicle speed is greater than the threshold vehicle speed (e.g. 0 mph), control computer 12 is operable to continually broadcast a PTO moving fuel value onto signal paths 38 as is known in the art, wherein the PTO moving fuel value corresponds to a fueling command issued by control computer to fuel system 32 indicative of a current fueling rate under a vehicle moving PTO operational mode. In this case, auxiliary computer 76 is operable at step 114 to receive the PTO moving fuel value broadcast by control computer 12 and record this fueling value for the present jurisdiction within memory 92. Algorithm execution continues from steps 114 and 116 at step 128.

If, at step 110, control computer 12 determines that PTO mode is not operational, algorithm 100 advances to step 118 where control computer compares vehicle speed to a vehicle speed threshold (e.g. 0 mph). If, at step 118, control computer 12 determines that vehicle speed is greater than the vehicle speed threshold, control computer 12 is operable to continually broadcast a driving fuel value onto signal paths 38 as is known in the art, wherein the driving fuel value corresponds to a fueling command issued by control computer to fuel system 32 indicative of a current fueling rate under a normal vehicle driving operational mode. In this case, auxiliary computer 76 is operable at step 120 to receive the driving fuel value broadcast by control computer 12 and record this fueling value for the present jurisdiction in memory 92. If, on the other hand, control computer 12 determines at step 118 that vehicle speed is not greater than the vehicle speed threshold (e.g. 0 mph), control computer 12 is operable to continually broadcast an idle fuel value onto signal paths 38 as is known in the art, wherein the idle fuel value corresponds to a fueling command issued by control computer to fuel system 32 indicative of a current fueling rate under engine idling conditions (i.e., engine speed controlled to a low idle engine speed value as is known in the art). In this case, auxiliary computer 76 is operable at step 122 to receive the idle fuel value broadcast by control computer 12 and record this fueling value for the present jurisdiction in memory 92. Thereafter at step 124, auxiliary computer 76 is operable to determine whether the engine idling condition has existed at least more than a first time period $T_1$ since engine idling commenced, but less than a second longer time period $T_2$ since engine idling commenced. The engine idling condition described by step 124 is, in one embodiment, intended to define a so-called "short stop" idling period wherein the engine is idling for some short time duration. One example of a short stop idling period may occur when a driver stops for fuel and leaves the engine running under idle conditions. Other examples will occur to those skilled in the art. In any case, if auxiliary computer 76 determines at step 124 that a short stop has occurred, auxiliary computer 76 is operable at step 126 to record a short stop fuel value for the present jurisdiction in memory 92, wherein the short stop fuel value corresponds to the fuel used by engine 14 for the duration of the short stop. Algorithm execution advances from steps 120 and 126, and from the no branch of step 124, to step 128. In an embodiment of the present invention wherein control computer 12 is operable to execute algorithm 100, it is to be understood that the foregoing steps of recording fuel values may alternatively be carried out by control computer 12, and the values may be accordingly stored within memory 15.

At step 128, auxiliary computer 76 is operable to determine whether it is appropriate to determine whether the vehicle carrying engine 14 has entered a new jurisdiction. In one embodiment, auxiliary computer 76 is operable to execute step 128 by determining whether the vehicle carrying engine 14 has traveled a predetermined distance. Preferably, auxiliary computer 76 keeps track of trip mileage via information provided thereto by control computer 12 on signal paths 38. Alternatively, system 10 may include an odometer 40 operable to provide auxiliary computer 76 with an odometer signal indicative of distance traveled by the vehicle. In an embodiment wherein control computer 12 is operable to execute algorithm 100, control computer 12 is preferably operable to compute mileage based on information provided thereto such as vehicle speed, although odometer 40 may provide control computer 12 with an odometer signal indicative of distance traveled. In any case, auxiliary computer 76 is preferably operable at step 128 to loop back to step 104 if the vehicle has traveled more than a predefined distance, and to otherwise loop back to step 110. Alternatively, auxiliary computer 76 may be operable at step 128 to loop back to step 104 only if a predefined time period has elapsed since last executing step 104, and otherwise looping back to step 110.

It should now be apparent from the foregoing that system 10 is operable to accumulate, through repeated iterations of algorithm 100, the total fuel used by the vehicle carrying engine 14 in each jurisdiction traveled. In one preferred embodiment, signal paths 38 comprise a J1587 or J1939 data link, and control computer 12 is operable to broadcast onto the J1587 or J1937 data link current fueling values corresponding to a number of engine operational modes; namely PTO non-moving fuel, PTO moving fuel, driving fuel and idle fuel. System 10 is accordingly operable to accumulate PTO moving fuel, PTO non-moving fuel, driving fuel and idle fuel, corresponding to total fuel used in each of the categories for each jurisdiction traveled. Additionally, system 10 is preferably operable to accumulate short stop fuel usage in each jurisdiction when operating conditions meet the short stop criteria. The foregoing information is, in accordance with the present invention, accumulated between manual activations of an auxiliary switch if system 10 does not include a GPS receiver, wherein each manual activation of the auxiliary switch is time and date stamped for subsequent jurisdiction determinations, and is accumulated automatically for each jurisdiction traveled if system 10 includes a GPS receiver.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected.

What is claimed is:

1. A system for determining fuel usage within a jurisdiction, comprising:

means for determining a jurisdiction of a vehicle carrying an internal combustion engine;

means responsive to fueling signals for supplying fuel to said engine;

means for producing said fueling signals and for producing fueling values corresponding to fuel quantities associated with said fueling signals; and means for continually accumulating said fueling values while said vehicle is within said jurisdiction to thereby determine a total fuel quantity used by said engine within said jurisdiction.

2. The system of claim 1 wherein said means for continually accumulating said fueling values includes means for separately accumulating said fueling values within any jurisdiction traveled by said vehicle to thereby determine a total fuel quantity used by said engine within any jurisdiction.

3. The system of claim 1 wherein said means for determining a jurisdiction of a vehicle carrying an internal combustion engine includes a switch;

and wherein actuation of said switch corresponds to entrance of said vehicle into said jurisdiction.

4. The system of claim 3 further including means responsive to actuation of said switch for date and time stamping a first one of said fueling values.

5. The system of claim 1 wherein said means for determining a jurisdiction of a vehicle carrying an internal combustion engine includes:

a global positioning system (GPS) receiver operable to produce position information indicative of a present location of said vehicle;

a memory having jurisdiction boundary information corresponding to a number of separate jurisdictions stored therein; and means for comparing said position information with said jurisdiction boundary information and determining therefrom a jurisdiction in which said vehicle is located.

6. The system of claim 1 wherein said means for producing said fueling signals and for producing fueling values corresponding to fuel quantities associated with said fueling signals includes a control computer operable to manage overall operation of said internal combustion engine.

7. The system of claim 6 wherein said control computer includes said means for continually accumulating said fueling values while said vehicle is within said jurisdiction.

8. The system of claim 7 wherein said control computer includes said means for determining a jurisdiction of a jurisdiction of a vehicle carrying an internal combustion engine.

9. The system of claim 6 wherein said means for continually accumulating said fueling values while said vehicle is within said jurisdiction includes an auxiliary computer coupled to said control computer.

10. The system of claim 9 further including a serial data link connecting said control computer to said auxiliary computer, said auxiliary computer receiving said fueling values from said control computer via said serial data link.

11. The system of claim 10 wherein said control computer and said auxiliary computer are configured for communication therebetween over said serial data link according to one of a J1587 and a J1939 communications protocol.

12. The system of claim 9 wherein said auxiliary computer includes said means for determining a jurisdiction of a vehicle carrying an internal combustion engine.

13. The system of claim 1 further including means for determining vehicle speed and producing a vehicle speed signal corresponding thereto;

and wherein said means for continually accumulating said fueling values while said vehicle is within said jurisdiction includes means for continually accumulating said fueling values as driving fuel values while said vehicle speed signal indicates a vehicle speed greater than a vehicle speed threshold and for continually accumulating said fueling values as idling fuel values while said vehicle speed signal indicates a vehicle speed value below said vehicle speed threshold.

14. The system of claim 1 further including:

means for determining vehicle speed and producing a vehicle speed signal corresponding thereto; and a power-take-off unit (PTO) operatively connected to said engine, said PTO operable in a non-moving PTO mode when said vehicle speed signal indicates a vehicle speed less than a vehicle speed threshold and in a moving PTO mode when said vehicle speed signal indicates a vehicle speed greater than said vehicle speed threshold;

and wherein said means for continually accumulating said fueling values/while said vehicle is within said jurisdiction includes means for continually accumulating said fueling values as PTO non-moving fuel values while said PTO is operable in said non-moving mode and for continually accumulating said fueling values as PTO moving fuel values while said PTO is operable in said moving mode.

15. The system of claim 14 wherein said means for continually accumulating said fueling values while said vehicle is within said jurisdiction includes means for continually accumulating said fueling values as driving fuel values while said vehicle speed signal indicates a vehicle speed greater than said vehicle speed threshold and said PTO is not operational, and for continually accumulating said fueling values as idling fuel values while said vehicle speed signal indicates a vehicle speed value below said vehicle speed threshold and said PTO is not operational.

16. The system of claim 1 further including:

means for determining vehicle speed and producing a vehicle speed signal corresponding thereto; and means for maintaining real time and producing a real time signal corresponding thereto;

and wherein said means for continually accumulating said fueling values while said vehicle is within said jurisdiction includes means for continually accumulating said fueling values as short stop fuel values while said vehicle speed signal indicates a vehicle speed less than a vehicle speed threshold for a time interval indicated by said real time signal that is less than a predefined time interval.

17. A system for determining fuel usage within a jurisdiction, comprising:

a fuel system responsive to fueling signals to supply fuel to an internal combustion engine;

a control computer producing said fueling signals and broadcasting fueling values corresponding to fuel quantities associated with said fueling signals; and a driver interface module including means for determining a jurisdiction of a vehicle carrying said internal combustion engine and an auxiliary computer receiving said fueling values broadcast by said control computer, said auxiliary computer continually accumulating said fueling values as long as said vehicle is within said jurisdiction to thereby determine a total fuel quantity used by said engine within said jurisdiction.

18. The system of claim 17 wherein said auxiliary computer is operable to separately accumulate said fueling value within any jurisdiction traveled by said vehicle to thereby track a total fuel quantity used by said engine within any jurisdiction.

19. The system of claim 17 wherein said means for determining a jurisdiction of a vehicle carrying an internal combustion engine includes a switch;

and wherein actuation of said switch corresponds to entrance of said vehicle into said jurisdiction.

20. The system of claim 19 wherein said driver interface module includes a keypad having a plurality of key switches associated therewith;

and wherein said actuation of said switch corresponds to actuation of at least one of said key switches.

21. The system of claim 19 wherein said driver interface module includes a display having at least one touch-screen switch associated therewith;

and wherein said actuation of said switch corresponds to actuation of said at least one touch-screen switch.

22. The system of claim 19 wherein said auxiliary computer includes means responsive to actuation of said switch for date and time stamping a first one of said fueling values.

23. The system of claim 17 wherein said means for determining a jurisdiction of a vehicle carrying an internal combustion engine includes:

a global positioning system (GPS) receiver operable to produce position information indicative of a present location of said vehicle;

a memory having jurisdiction boundary information corresponding to a number of separate jurisdictions stored therein; and means for comparing said position information with said jurisdiction boundary information and determining therefrom a jurisdiction in which said vehicle is located.

24. The system of claim 17 further including means for determining vehicle speed and producing a vehicle speed signal corresponding thereto;

and wherein said auxiliary computer is operable to continually accumulate said fueling values as driving fuel values while said vehicle speed signal indicates a vehicle speed greater than a vehicle speed threshold and to continually accumulate said fueling values as idling fuel values while said vehicle speed signal indicates a vehicle speed value below said vehicle speed threshold.

25. The system of claim 17 further including:

means for determining vehicle speed and producing a vehicle speed signal corresponding thereto; and a-power-take-off unit (PTO) operatively connected to said engine, said PTO operable in a non-moving PTO mode when said vehicle speed signal indicates a vehicle speed less than a vehicle speed threshold and in a moving PTO mode when said vehicle speed signal indicates a vehicle speed greater than said vehicle speed threshold;

and wherein said auxiliary computer is operable to accumulate said fueling values as PTO non-moving fuel values while said PTO is operable in said non-moving mode and to continually accumulate said fueling values as PTO moving fuel values while said PTO is operable in said moving mode.

26. The system of claim 25 wherein said auxiliary computer is operable to accumulate said fueling values as driving fuel values while said vehicle speed signal indicates a vehicle speed greater than said vehicle speed threshold and said PTO is not operational, and to continually accumulate said fueling values as idling fuel values while said vehicle speed signal indicates a vehicle speed value below said vehicle speed threshold and said PTO is not operational.

27. The system of claim 17 further including:

means for determining vehicle speed and producing a vehicle speed signal corresponding thereto; and means for maintaining real time and producing a real time signal corresponding thereto;

and wherein said auxiliary computer is operable to continually accumulate said fueling values as short stop fuel values while said vehicle speed signal indicates a vehicle speed less than a vehicle speed threshold for a time interval indicated by said real time signal that is less than a predefined time interval.

* * * * *